United States Patent [19]

Dolgow et al.

[11] Patent Number: 4,488,794
[45] Date of Patent: Dec. 18, 1984

[54] PHOTOGRAPHIC APPARATUS FOR MAKING SIMULTANEOUS EXPOSURES

[75] Inventors: Joanne Dolgow, 407 Pershing Dr., Silver Spring, Md. 20910; David Riddle, Northridge, Calif.

[73] Assignee: Joanne Dolgow, Silver Spring, Md.

[21] Appl. No.: 392,686

[22] Filed: Jun. 28, 1982

[51] Int. Cl.³ ............... G03B 17/24; G03B 17/50; G03B 41/00

[52] U.S. Cl. ............... 354/83; 354/106; 354/110; 354/195.1; 354/293

[58] Field of Search ............... 354/105, 106, 107, 108, 354/110, 112, 113, 118, 119, 195.1, 293, 81, 83; 352/92

[56] References Cited

U.S. PATENT DOCUMENTS

| 765,980 | 7/1904 | Mercier | 354/113 |
|---|---|---|---|
| 1,153,229 | 9/1915 | Ives | 354/104 |
| 2,018,891 | 10/1935 | Kean | 354/110 |
| 2,458,466 | 1/1949 | Campbell | 354/113 |
| 2,478,301 | 8/1949 | Mourfield | 354/118 |
| 2,529,905 | 11/1950 | Berssenbrugge | 354/110 |
| 2,548,213 | 4/1951 | Gittins | 354/110 |
| 2,565,618 | 8/1951 | Mourfield | 354/118 |
| 2,609,738 | 9/1952 | Staehlin et al. | 354/113 |
| 2,800,842 | 7/1957 | Albrecht | 354/110 |
| 2,921,509 | 1/1960 | Freund | 354/119 |
| 3,045,573 | 7/1962 | Wanner | 354/113 |
| 3,283,685 | 11/1966 | Cummins | 354/118 |
| 3,449,046 | 6/1969 | White | 352/92 |
| 3,608,456 | 9/1971 | Hauser | 354/119 |
| 3,928,863 | 12/1975 | Stewart et al. | 354/110 |
| 3,953,868 | 4/1976 | Kawamura et al. | 354/109 |
| 3,987,467 | 10/1976 | Cowles | 354/105 |
| 4,081,814 | 3/1978 | Bulland | 354/293 |
| 4,232,956 | 11/1980 | Hashimoto et al. | 354/106 |
| 4,248,510 | 2/1981 | Baker et al. | 354/119 |
| 4,272,177 | 6/1981 | Ottenheimer | 354/293 |
| 4,361,388 | 11/1982 | Mlcak et al. | 354/106 |

*Primary Examiner*—A. A. Mathews
*Attorney, Agent, or Firm*—Epstein & Edell

[57] ABSTRACT

Two separate cameras are mounted together and synchronized in focus and shutter actuation to provide simultaneous exposures on separate film or other image recording media. The primary camera includes a system view finder which permits observation of the field of view along the optical axis of the primary camera. A second camera, which has its optical axis oriented parallel to the primary camera axis, has its field of view corrected for parallax distortion by a prism which is selectively attachable to the lens of the second camera. The second camera provides an instant positive print which serves as a proof for the photograph taken by the primary camera. Identical identification numbers are printed on both of the exposures by means of respective LED arrays actuated along with the shutters to print a number representing the count in an electronic counter. The number in the electronic counter is incremented automatically upon each shutter actuation.

23 Claims, 9 Drawing Figures

PHOTOGRAPHIC APPARATUS FOR MAKING SIMULTANEOUS EXPOSURES

BACKGROUND OF THE INVENTION

1. Field of the Invention

The present invention relates to improved photographic apparatus and, more particularly, to apparatus for making simultaneous exposures on separate image recording media. Although the invention has particular utility for portrait photography, it can also be used in substantially all aspects of both professional and amateur photography.

2. Description of the Prior Art

The normal procedure in portrait photography involves photographing a subject in several different poses on a film from which contact prints are subsequently made on photosensitized paper. The contact prints serve as proofs from which a customer may select the desired pose or poses which can then be reproduced on more permanent photographic paper. This procedure is relatively time-consuming, expensive and does not indicate the results of the photography until a time subsequent to the actual taking of the pictures. During this period of time, the customer may decide against accepting the pictures or the customer may be unavailable, resulting in a loss to the photographer. Moreover, care must be taken to properly identify the proofs relative to the negatives so that the poses selected by the customer can be easily identified for purposes of printing the final portrait.

It has been suggested that two cameras can be employed to rectify the aforesaid problem; one of the cameras would provide an instant positive print by well known techniques and the other camera would retain a more permanent record, usually on negative film. Such systems have not been accepted commercially for a number of reasons. First, two separate cameras disposed in adjacent relation do not receive identical images because of parallax distortion. The proof, therefore, does not encompass the same field of view as would the final product. Of course, this can be circumvented by exposing a larger field of view for both cameras than is actually required for the final product and then cropping as necessary; however, this approach requires additional enlargement for the final product with corresponding loss of image quality. Second, prior art attempts to employ two cameras in adjacent relation have not adequately solved the multi-fold problem of synchronizing shutter actuation time, synchronizing shutter actuation speed, synchronizing the focus control on both cameras, and synchronizing the diaphragm aperture control on both cameras. Third, the photographer is left with a difficult task in matching the proofs to the negatives.

Another approach to providing instant proofs for a portrait photographer is found in each of U.S. Pat. Nos. 1,153,229 (Ives), 2,018,891 (Kean), 2,921,509 (Freund), 3,608,456 (Hauser), and 3,643,570 (Reid et al). Each of these patents discloses a single camera housing in which light from a single exposure lens is split by means of a light beamsplitter and directed to two separate films within the single housing. It is well known, however, that light energy reflected from and passing through a beamsplitter is attenuated to a considerable degree. The resulting attentuation is, in many instances, unacceptable for professional and high standard amateur photography.

Another approach to the problem may be found in U.S. Pat. Nos. 2,478,301 (Mourfield) and 2,565,618 (Mourfield). Mourfield discloses a single housing arrangement with separate lenses and separate paths for the light energy to individual film planes. The two lenses are arranged concentrically about two spaced parallel optical axes. This arrangement results in parallax distortion whereby the image projected onto one film plane is not precisely that which is projected onto the other film plane, particularly in close-up photography situations. Mourfield discloses a technique for interrelating the prints from one film with the negatives of the other by means of a mechanical notching arrangement. Specifically, the films are notched in a manner to cross-identify the proof and negative of the separate films. This arrangement is relatively mechanically complex and is subject to failure due to wear and tear.

In U.S. Pat. No. 2,800,842 (Albrecht), a conventional twin lens reflex camera is modified to permit the upper or viewing chamber to also be used for picture-taking purposes with a separate film therein. Again, the two lenses are arranged in a manner which provides parallax distortion for which no correction is suggested in the Albrecht patent. In addition, Albrecht does not provide for identifying the prints and negatives so that they can be correlated with one another.

In U.S. Pat. No. 3,928,863 (Stewart et al), there is disclosed an identification card camera wherein two separate lenses are provided in a single housing, each lens being arranged to project an image onto its own separate film plane. There is no attempt made to correct for parallax distortion. Stewart et al discloses the provision of identification data on the exposed images; however, this identification data is received through a separate data lens and projected onto the film planes from outside the camera housing.

Another prior art approach of interest is found in U.S. Pat. No. 3,283,685 (Cummins) wherein a single camera housing is provided with six separate lenses. Each lens projects its image onto a respective area of a single film. This camera is employed for portrait purposes by setting each of the lenses to different exposures so that an instant proof with six exposures at different light settings may be obtained. This permits the photographer to determine the proper exposure setting and then use the selected exposure setting to take a second picture.

It should be noted that the single housing approach to obtaining simultaneous exposures on separate films, apart from the disadvantages noted above, suffers from the problem of requiring optical isolation between the light paths to the separate films. Often this isolation is not complete, resulting in inadvertent exposure between the separate image paths. Moreover, in order to provide the necessary optical isolation, light blocking structure must be carefully designed and installed within the camera housing, thereby considerably adding to the camera cost.

OBJECTS AND SUMMARY OF THE INVENTION

It is an object of the present invention to provide a photographic apparatus for making two simultaneous exposures, one of which is an instant positive print, without using beamsplitters, wherein compensation is provided for parallax distortion, and wherein the separate simultaneous exposures are automatically marked with the same identification number for cross-correlation purposes.

It is another object of the present invention to employ two separate cameras, which are mounted together and synchronized as to shutter actuation, aperture size and focus, to provide simultaneous separate exposures of the same field of view and wherein an identification number is automatically exposed onto both exposures and incremented upon each shutter actuation.

It is still another object of the present invention to provide a photographic apparatus for making separate simultaneous exposures with two substantially identical synchronized cameras, one of which is loaded with negative film and the other with instant positive film.

In accordance with the present invention, two individual cameras have their bottom walls secured to mounting plates which are secured to one another such that the lenses of the two cameras are oriented in the same direction parallel to one another. The primary camera, in which the exposure is made on negative film or other image recording media, includes a view finder which permits observation along the optical axis of the primary camera. The secondary camera, in which the exposure is made on "instant" positive film, has no view finder but is selectively fitted with a parallax-correcting prism adapted to be mounted in front of the second camera lens. The shutters of the two cameras are synchronized for simultaneous actuation. Each camera includes an array of light-emitting diodes which are energizable in response to shutter actuation to register a number currently stored in a common electronic counter so as to expose that number onto both films. The counter is automatically incremented by each shutter actuation to provide a sequence of exposure numbers by which each pair of simultaneous exposures can be identified. The diaphragm apertures of the two cameras are preferably linked so that the aperture size can be adjusted with a common control for both cameras simultaneously. Likewise, the focus controls for both cameras are preferably linked so that the focus control can be adjusted with a common control for both cameras simultaneously.

In a preferred embodiment, both cameras are the same model, the secondary camera being modified to receive an instant positive film pack. The similar cameras, when synchronized in aperture size, shutter speed and focus control, combine with the parallax compensation prism to provide for an instant proof which very accurately represents the exposure made by the primary camera.

In the assembled unit, only the primary camera has a view finder, the view finder for the secondary camera being removed. However, the two cameras may be used independently, when dismounted from one another, with the view finder for the secondary camera being replaced.

The primary camera, in the preferred embodiment, provides exposures on negative film; however, it will be appreciated that positive film may likewise be employed, as may any image recording medium including electronic and/or magnetic media.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings, wherein.

DESCRIPTION OF THE PREFERRED EMBODIMENTS

Figure 1:
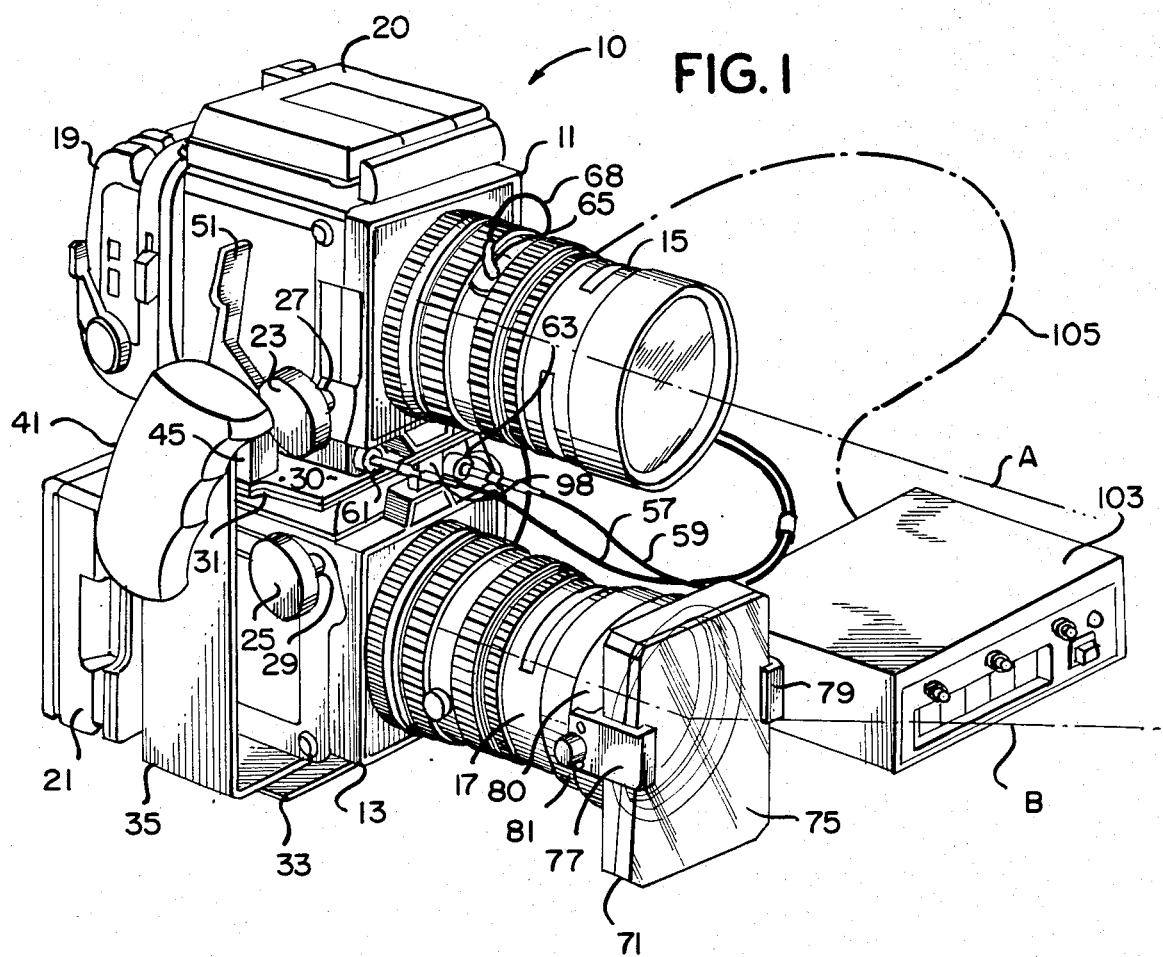
FIG. 1 is a view in perspective of the preferred embodiment of the photographic apparatus of the present invention showing the front and one side of the apparatus as viewed from above.
Figure 3:
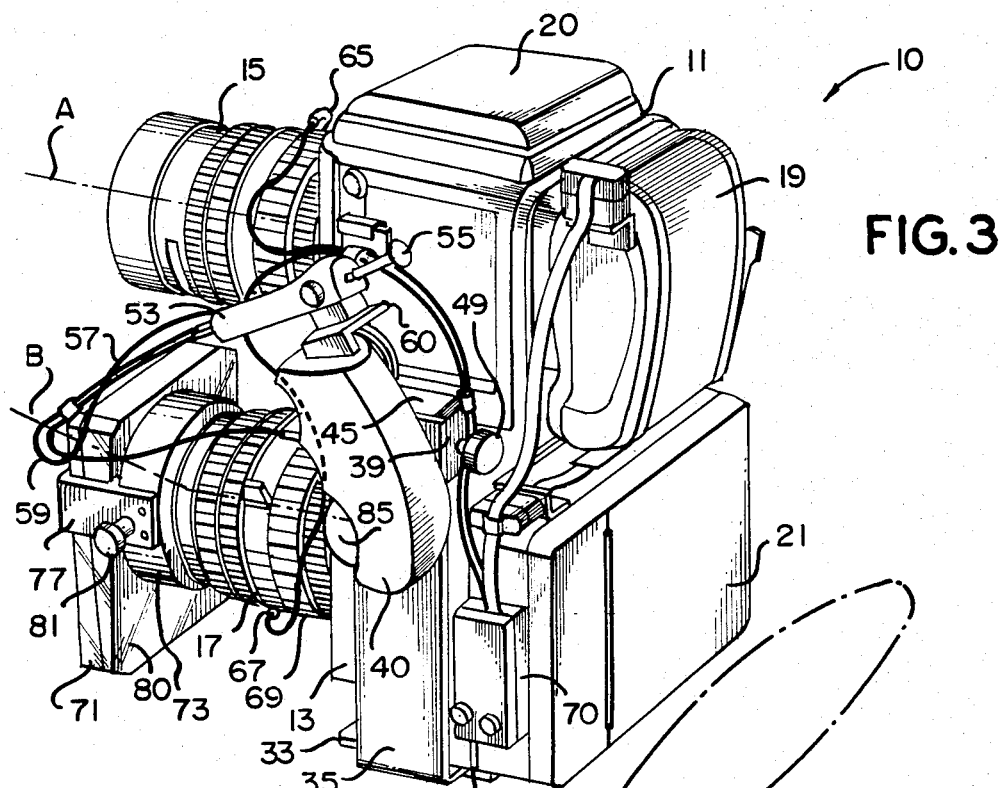
FIG. 3 is a view in perspective of the apparatus of FIG. 1 taken from the rear and above the unit.
Figure 8:
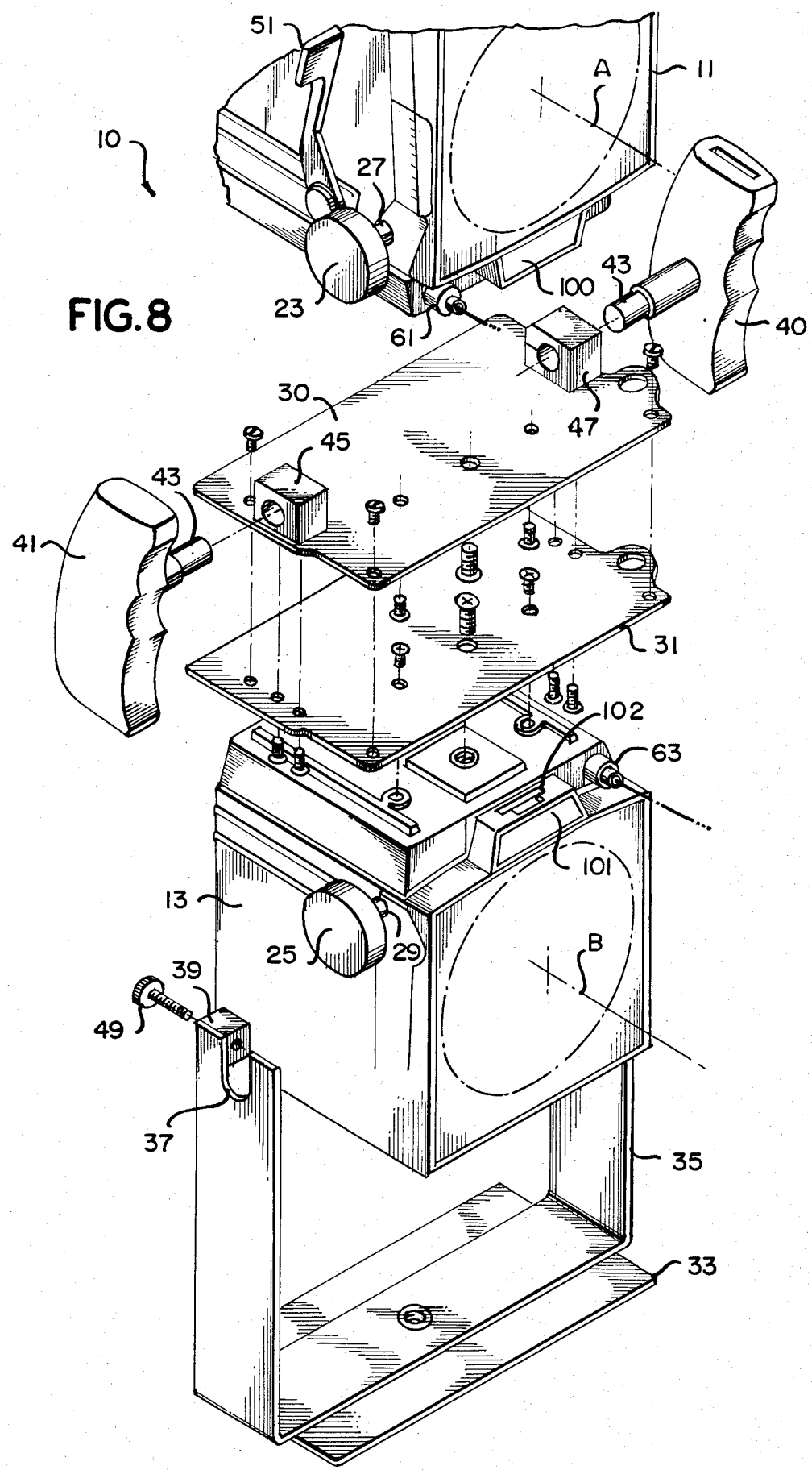
FIG. 8 is an exploded view in perspective showing the mounting arrangement for securing the two cameras of FIG. 1 together.

Referring specifically to FIGS. 1, 3 and 8 of the accompanying drawings, a photographic apparatus 10, corresponding to a preferred embodiment of the present invention, includes a primary camera body or housing 11 and a secondary camera body or housing 13. In this preferred embodiment, the camera housings 11 and 13 are housings from the same model camera which have been slightly modified to accommodate the features of the present invention. For example, in the specific embodiment described and illustrated herein, both camera housings 11 and 13 are Mamiya-Sekor Model RB67. It will be understood that other model cameras can be employed and that the two camera housings 11 and 13 need not be from the same model camera. A focusing lens 15 is secured to the forward wall of primary camera housing 11 and is concentrically disposed about the optical axis A for that camera. A focusing lens 17 is secured to extend forwardly from secondary camera housing 13 and is concentrically disposed about the optical axis B for the secondary camera. A camera back 19 for the primary camera is arranged to support negative film in a plane generally perpendicular to optical axis A, the film being selectively advanced by means of film advance lever 50. In the preferred embodiment illustrated and described herein, the negative film employed with the primary camera may be either 120 or 220 size. A view finder 20, shown in the collapsed or non-viewing condition in the drawings, is provided for the primary camera and is disposed at the top wall thereof.

The secondary camera is disposed upside down relative to the primary camera so that the bottom walls of the two camera housings 11 and 13 face one another. A camera back 21 is secured to the secondary housing rear wall and is oriented such that the plane of the film supported therein is oriented perpendicular to optical axis B of the secondary camera. Film back 21 is adapted to hold a positive film of the instant development type, such as the Model No. 500 film holder manufactured by the Polaroid Corporation of Cambridge, Mass., or the like. Any suitable commercial positive image film, which develops within the film pack, may be employed therein.

The primary camera has a focus control knob 23 which rotates a focus control shaft 27 in a conventional manner to effect a change in the effective focal length of the primary camera lens system. Similarly, a secondary camera focus control knob 25 is manually rotatable to rotate focus control shaft 29 to change the effective focal length of the lens system in the secondary camera. Control knobs 23 and 25 are disposed at the same side of the apparatus, namely the left side as viewed from the front of the cameras.

An upper mounting plate 30, which has a generally flat rectangular shape, is secured to the bottom wall of the primary camera housing 11 by means of screws 36 which are inserted through suitably provided openings 32 in plate 30 to engage threaded bores (not illustrated) in the bottom wall of housing 11. A bottom mounting plate 31, having the same general configuration as upper mounting plate 30, is secured to the upward facing bottom wall of housing 13 by means of similar screws 36 extending through holes 32 in the mounting plate to engage threaded recesses 38 in the bottom wall of housing 13. The two housings 11 and 13 are joined together by joining the mounting plates 30, 31 by means of suitable screws extending through aligned apertures in the two plates and engaged by nuts or the like. The housings 11 and 13, thusly joined together. are positioned in mutually fixed relationship with their lenses 15 and 17 pointing in the same direction and their optical axes A and B disposed in parallel spaced relation.

A support plate 33 of generally rectangular configuration has a centrally defined aperture arranged to be aligned with a similar aperture 34 defined in the base of a U-shaped bracket member 35. Support plate 33 and the U-shaped bracket member 35 are secured to the downwardly facing top wall of secondary camera housing 13 by means of a screw which extends through the aperture in plate 33 and aperture 34 to threadedly engage a suitably provided threaded recess in housing 13. For this purpose, the view finder for the secondary camera is removed from the downwardly facing top surface of housing 13. The U-shaped bracket member 35 has generally U-shaped slots 37 defined downwardly from the upper extremity of the upwardly-extending arms of the bracket member. A pair of handle support blocks 39 are secured to the inner surface of each arm of bracket member 35 rearwardly of slots 37. Each handle support block 39 is provided with a threaded through hole extending horizontally through the block from front to rear. A pair of handles 40, 41 take the form of plastic grips having inwardly facing surfaces from which handle support shafts 43 project horizontally. The handle support shafts 43 are arranged to extend through slots 37 to be slidably received in respective apertured journal blocks 45, 47 which are disposed on the top surface of the upper mounting plate 30. Specifically, the journal blocks 45, 47 are disposed on either side of housing 11, rearwardly of control knob 23 and are apertured so that the handle support shafts 43 may freely rotate therein. The handles may be fixed in position relative to the camera housings 11, 13 by means of thumb screws 49 which are threadedly received in handle support blocks 39 and project through threaded apertures in those blocks to bear radially against the handle support shafts 43. The handles 40, 41 may, therefore, be rotated to the desired orientation relative to the housings and then fixed in position relative to the housings by tightening the thumb screws 49.

Figure 6:
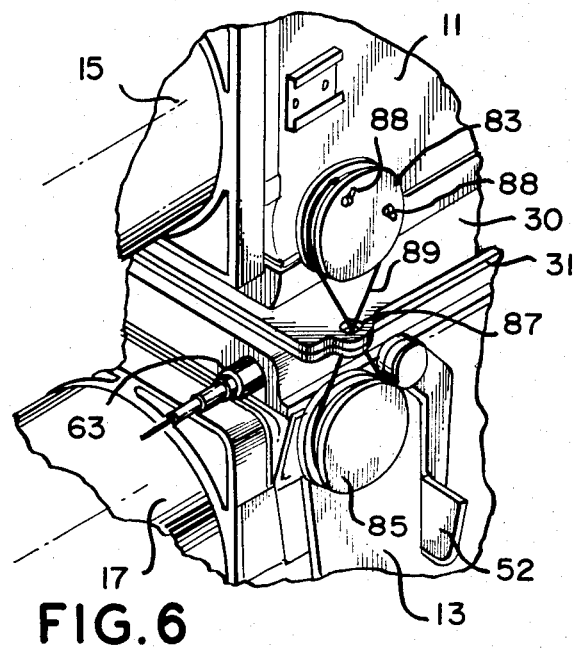
FIG. 6 is a detailed view in perspective of the apparatus employed to synchronize the focusing arrangement for the two cameras illustrated in FIG. 1.

A shutter cocking lever 51 is provided for the primary camera and is disposed just rearwardly of the focus control knob 23. A similar shutter cocking lever 52, best illustrated in FIG. 6, is disposed on the opposite side of the apparatus. A shutter cable actuator housing 53 is provided with an actuator plunger 55 which, in a well known manner, mechanically actuates actuator cables 57, 59 to actuate the shutter mechanisms of the respective cameras. Housing 53 causes both actuator cables 57 and 59 to be simultaneously actuated, thereby assuring that both shutters are actuated simultaneously. A support bracket 60 is secured to the underside of the shutter cable actuator housing 53 and is removably mountable on handle 40 in a position whereby the plunger 55 can be readily actuated by the thumb of the photographer. Actuator cable 57 has its distal end connected to the shutter actuator cable connector 61 of the primary camera; likewise, the distal end of actuator cable 59 is connected to the shutter cable actuator connector 63.

The flash synchronization shutter contact 65 on lens 15 is connected to a flash cable 68. Similarly, the flash synchronization shutter contact 67 on lens 17 is connected to a cable 69. Cables 68 and 69 are connected to a junction box 70 which is mounted along one side of the camera back 21 of the secondary camera. The junction box 70 is described in somewhat greater detail below in relation to FIG. 4.

Figure 2:
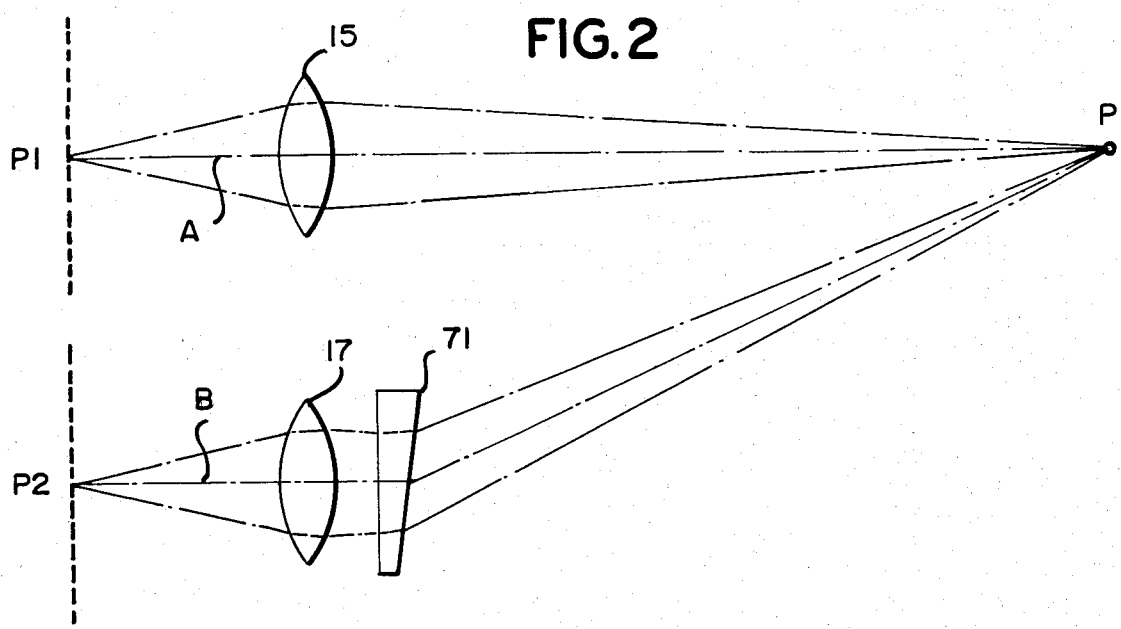
FIG. 2 is a schematic diagram of the parallax compensation feature employed in the apparatus of FIG. 1.

A parallax compensation arrangement includes a parallax compensating prism 71 having a rear surface 73 and front surface 75. The prism 71 is tightly secured between two arms 77, 79 of a prism mounting bracket which additionally includes a bracket ring 80 disposed rearwardly of prism 71 between the two arms 77 and 79. The bracket ring 80 fits over the forward end of lens 17 and is secured thereto by means of thumb screws which can be tightened to extend radially against the outer periphery of the lens housing. Prism 71 is secured with its rear surface 73 disposed perpendicular to the optical axis B of the secondary camera. The forward surface 75 of the prism tapers toward the rearward surface in a direction away from the lens 15 of the primary camera, whereby the upper portion of the prism 71 is thicker than the lower portion. The prism thusly configured, as best illustrated diagramatically in FIG. 2, serves to bend the field of view of lens 17 toward the optical axis A of the primary camera. Prism 71 thus provides correction for parallax distortion resulting from the spacing of the two lenses 15 and 17. This correction is particularly important in portrait photography wherein the subject is relatively close to the camera. The near field of view of the secondary camera is, therefore, rendered substantially coincident with the near field of view of the primary camera. Since the thumb screws 81 are easily loosened and the ring 80 removed from lens 17, the apparatus 10 may be operated without the parallax correcting prism 71 if desired; such would be the case for photographing objects which are disposed a relatively long distance (i.e. in excess of 12 to 15 feet) from the apparatus.

It is preferred that the focus control for the primary and secondary cameras be synchronized so that the effective focal lengths of both cameras can be adjusted by adjusting a single mechanism. Apparatus for effecting this is illustrated in FIG. 6 to which specific reference is now made. A sheave 83 is secured to the end of focus control shaft 27 (see FIG. 8) remote from focus control knob 23. A similar sheave is secured to the end of focus control shaft 29 remote from focus control knob 25. The upper and lower mounting plates 30, 31 are apertured at 87 at a location between the two sheaves 83 and 85. A control cable 89 is wrapped in figure-eight fashion between the two sheaves so as to cross in the aligned apertures 87. Opposite ends of the control cable 89 are secured to sheave 83 by means of screws 88 about which the cable ends are wrapped. When either of the control knobs 23, 25 are rotated, the corresponding sheave rotates similarly and, through the action of the control cable 89, causes the other sheave to operate and thereby rotate the focus control shaft and control knob for the other camera. In assembling the focal control arrangement, the focal lengths of the lenses 15 and 17 are made equal before the control cable 89 is tightened about the sheaves.

It is also possible to control the diaphragm aperture size of the two cameras in synchronization. Apparatus for effecting this is disclosed and illustrated in U.S. Pat. No. 2,800,842 to Albrecht, the disclosure of which is expressly incorporated herein by reference.

Figure 7:
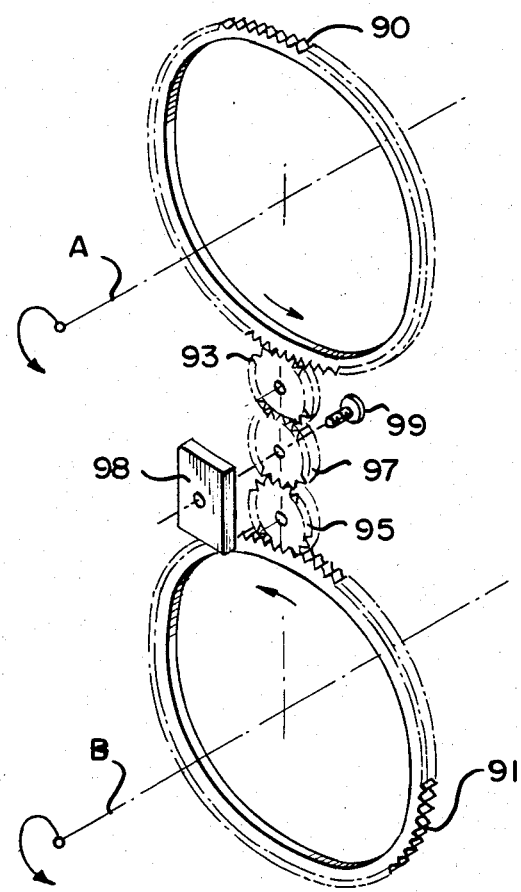
FIG. 7 is a detailed view in perspective of the gearing arrangement employed to synchronize shutter actuation for the two cameras illustrated in FIG. 1.

Synchronization of the operation of the shutters of the primary and secondary camera is effected by the apparatus illustrated in FIG. 7. Specifically, the primary camera is provided with a shutter actuating gear plate 90 which cooperates with cocking gear 93 in a conventional manner. Similarly, shutter actuating gear plate 91 of the secondary camera cooperates in a conventional manner with cocking gear 95. An idler or coupling gear 97 engages both cocking gears 93 and 95 so that when either of these gears is cocked or released, the corresponding motion is transmitted through the idler gear 97 to the other camera, thereby assuring simultaneous actuation of the two shutters. Idler gear 97 is mounted for rotation relative to a gear carrier plate 98 by means of a screw 99 extending through a central aperture in idler gear 97 to threadedly engage a suitably provided threaded bore in the gear carrier plate 98. The gear carrier plate 98, as best illustrated in FIG. 1, extends between cocking gear housing 100 (see FIG. 8) of primary camera housing 11 and a cocking gear housing 101 of the secondary camera housing 13. Cocking gear housings 100 and 101 are provided with access slots 102 through which their respective cocking gears 93, 95 extend to engage the idler or coupling gear 97.

Figure 4:
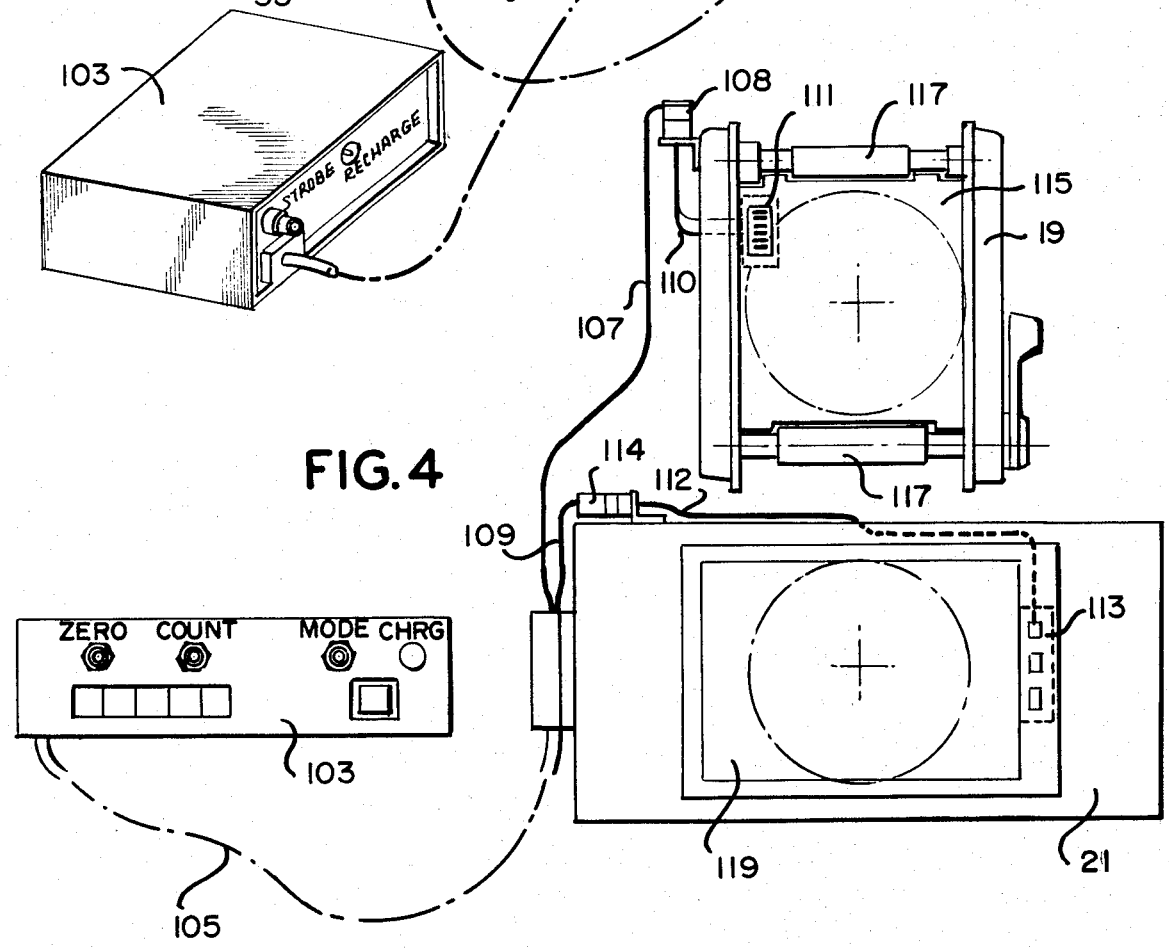
FIG. 4 is a partially diagramatic illustration of the apparatus employed to mark the individual exposures for identification purposes.

Apparatus for marking the exposures produced by both cameras with the same identification number is illustrated in FIG. 4 to which specific reference is now made. A control box 103, which contains power supply circuitry and control circuitry, is connected by means of a cable 105 to junction box 70. The power supply circuitry, which is not described herein, may include a battery and/or an A.C. converter circuit to supply the desired voltage required to operate a flash unit and to effect the control functions for the identification printout described hereinbelow. A mode switch 104 is provided at the control box 103 to provide selection of battery or a.c. operation. A charge lamp 106 indicates when the internal battery is being charged.

Figure 5:
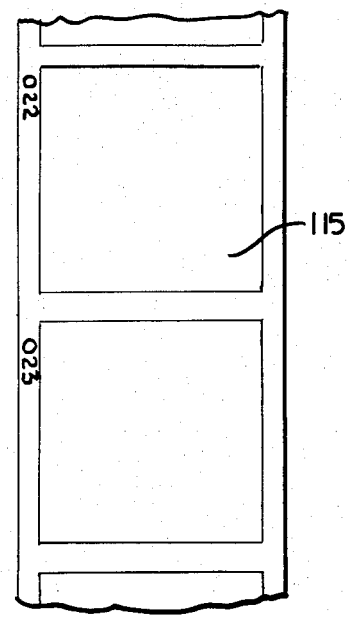
FIG. 5 is a diagramatic illustration of the finished exposures which have been marked in accordance with the apparatus illustrated in FIG. 4.

As noted above and as described in relation to FIGS. 1, 3 and 8, junction box 70 has flash control cables 57, 59 extending therefrom to the shutter actuated flash control switches at lenses 15 and 17. These cables are not illustrated in FIG. 4 for purposes of clarity since only the identification printout apparatus is intended to be illustrated in that figure. A multi-conductor ribbon cable 107 extends from junction box 70 to a connector 108 at the primary camera back 19. A further cable 110 connects to a light-emittting diode (LED) array 111 which is mounted inside camera back 19 such that the light-emitting diode elements are disposed along the border of the negative film 115. A second multi-conductor ribbon cable 109 extends to a connector 114 disposed at film back 21. A further multi-conductor cable 112 extends from the connector 114 and runs along the top of camera back 21 to a further LED array 113. LED array 113 is oriented with its light-emitting diodes positioned at the border of the positive instant film 119. Depending upon which of the light-emitting diode elements are energized, an identification number is printed along the border of the negative film 115 and along the border of the positive film 119 as illustrated in FIG. 5. Importantly, for each pair of simultaneous exposures in the two cameras, the same identification number is printed on each of films 115 and 119. The circuit for effecting operation of the LED arrays 111 and 113 in this manner is illustrated and described below in relation to FIG. 9.

Figure 9:
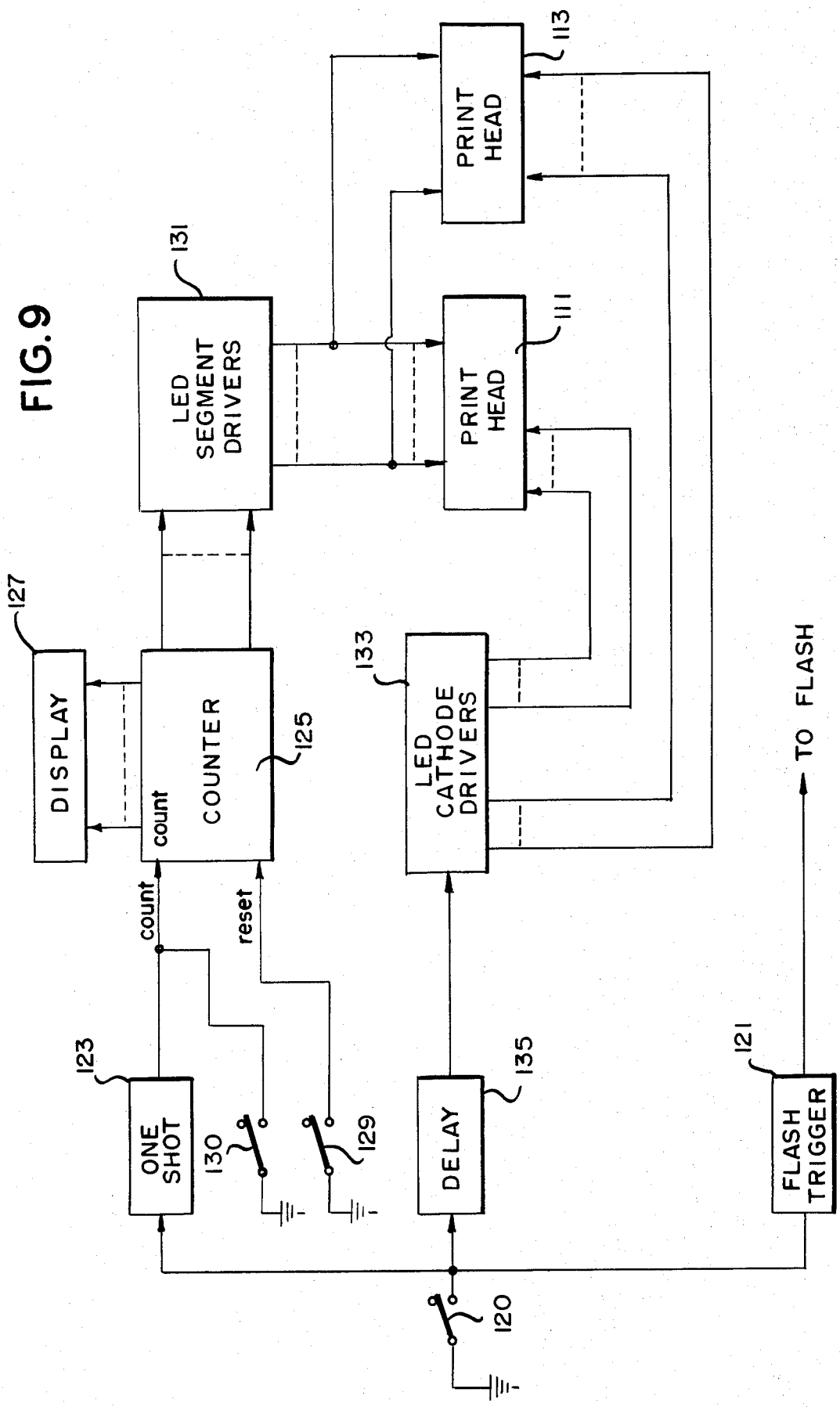
FIG. 9 is an electrical schematic diagram of the circuitry employed to effect sequential printing of identification numbers on the exposures made by the two cameras of FIG. 1.

Referring specifically to FIG. 9 of the accompanying drawings, a switch 120 schematically represents the switch function provided by the shutter closure contacts 65 and 67 and is closed when the shutter from either the primary or secondary camera is actuated. Closure of switch 120 operates the flash trigger 121 to operate an electronic flash unit that may be connected to the flash trigger. In addition, closure of switch 120 operates a one-shot multi-vibrator 123 to provide a count pulse to a binary counter 125. In this manner, the count in counter 125 is incremented with each actuation of the shutter mechanisms as represented by a closure of switch 120. The count presently in counter 125 is displayed automatically at the control box by means of the display element 127. The count in counter 125 may be selectively reset by means of the zero switch 129 provided at control box 103. In addition, the count in counter 125 may be manually incremented by successive depression of the count switch 130.

The binary or binary coded decimal output signals from counter 125, which represent the present count in that counter, are applied to the LED segment driver unit 131 which may, for example, correspond to integrated circuit 4511 such as is manufactured by any of a number of integrated circuit manufacturers. The LED segment drivers 131 selectively actuate the individual elements of the LED array print heads 111, 113 in accordance with the count appearing in counter 125. The LED array print heads 111, 113 are actuated by the LED cathode driver circuit 133 which may, for example, correspond to an integrated circuit type 4528. The cathode drivers for the LED arrays are operated on a delayed basis in response to closure of switch 120 by means of delay circuit 135. The delay effected by circuit 135 is provided to permit the count in counter 125 to be updated by the shutter actuation before the identification number is exposed onto the films.

The circuit of FIG. 9, as described above, operates in response to each shutter actuation to update the count in counter 125 and illuminate both LED array print heads 111 and 113 with the updated count so as to properly mark both of the exposures effected by the simultaneous shutter actuation. In a preferred embodiment, the LED array print head 111 employed for the negative film in the primary camera may be the array which is commercially available as Model No. ZJ1399 from the Olympic Optical Corporation. The LED array 113 may, for purposes of the preferred embodiment, take the form of the array FND-70 sold by Fairchild Semiconductor. The automatic annotation of both films using light-emitting diodes is extremely advantageous since it requires no mechanical elements which are subject to wear and tear and eliminates the need for the photographer to manually mark the resulting prints or to take descriptive notes at the time the photograph is taken.

The photographic apparatus described herein has been found to provide an instant proof which, because of the parallax compensating prism 71, accurately represents the field of view of a close-up portrait taken with the primary camera. In addition, the automatic print identification counter 125 and the automatic print-out of the count on the two films, provides a measure of convenience which has heretofore been impossible for photographers.

It should be noted that while the primary camera has been described in terms of using negative film, other types of recording media may be employed, such as discs, positive film, etc. The important aspect of the present invention is the use of two cameras joined together with parallax compensation and automatic electronic control over the identification number printout on both films.

It will be appreciated by those skilled in the art that a variety of different lenses can be employed in place of the specific lenses 15 and 17 illustrated in the preferred embodiment. Identical lenses may be used or, for some situations, it may be desirable to use different lenses on the primary and secondary cameras. It will also be appreciated that connectors 108 and/or 114 can be disconnected whenever it is desired to operate the two cameras without the print identification feature. Under such circumstances, the identification numbers will not appear on the prints. Of course, the entire electronic unit can be disconnected or bypassed and the identification feature can be eliminated in that way.

The present invention also incorporates within its scope apparatus for adapting two cameras in such a way that they may function to provide two simultaneous exposures as described hereinabove, In this regard, the apparatus may be sold separately from the cameras, in kit form, so that a user may secure two of his or her cameras together and modify them for synchronized utilization in providing simultaneous exposures wherein one of the exposures is an instant print.

While we have described and illustrated a specific embodiment of our invention, it will be clear that variations of the details of construction which are specifically illustrated and described may be resorted to without departing from the true spirit and scope of the invention as defined in the appended claims.

What is claimed is:

1. Photographic apparatus for providing first and second contemporaneous, individual records of a common image, said apparatus comprising:

first selectively actuable visual image recording means for recording a first visual image of objects within a field of view, said first visual image recording means including a first housing having a first opening defined therein and a first optical axis extending through said first opening and into said field of view;

second selectively actuable visual image recording means for recording a second visual image of objects within said field of view, said second visual image recording means including a second housing having a second opening defined therein, a second optical axis extending through said second opening and into said field of view, and positive image film pack means disposed along said second optical axis to receive and automatically form a photographic print of the recorded visual image in the field of view of said second recording means;

mounting means for securing said first and second housings together such that said first and second optical axes extend in parallel spaced relation in the same direction;

actuator synchronization means for synchronizing said first and second image recording means for simultaneous actuation; and parallax correction means removably securable to said second housing along said second optical axis.

2. The apparatus according to claim 1 further comprising:

first image identification means disposed in said first housing for recording symbols on each of said first recorded visual images to identify each image in a sequence of first recorded visual images; and second image identification means disposed in said second housing for recording symbols on each of said second recorded visual images to identify each second recorded visual image with a corresponding first recorded visual image.

3. The apparatus according to claim 2 further comprising means for visibly displaying symbols corresponding to the symbols to be recorded on said recorded visual images upon the next actuation of said first and second image recording means.

4. The apparatus according to claim 2 wherein said symbols include numbers and wherein said apparatus further comprises:

a manually actuable actuator for actuating said first and second image recording means;

counter means connected to provide a count which is incremented by each actuation of said actuator; and wherein said first and second image identification means includes means responsive to the count in said counter means for providing said symbols as a function of said count.

5. The apparatus according to claim 4 further comprising means for visibly displaying the count present in said counter means.

6. The apparatus according to claims 1, 2 or 4 wherein each of said first and second visual image recording means has its own focus control means, said apparatus further comprising means for mechanically linking the focus control means of said first and second recording means to permit automatic and simultaneous synchronized adjustment of both focus control means.

7. The apparatus according to claims 1, 2 or 4 wherein each of said first and second visual image recording means are cameras with respective first and second housing which are substantially identical except for said positive image film pack means of said second housing and a negative image film pack disposed along said first optical axis of said first housing.

8. The apparatus according to claim 7 wherein said mounting means comprises:

a first plate secured to one surface of said first housing;
a second plate secured to a corresponding surface of said second housing; and
means securing said first and second plates to one another in parallel orientation.

9. The apparatus according to claim 7 wherein each of said cameras has its own adjustable diapragm aperture and wherein said apparatus further comprises means for mechanically linking said diaphgram apertures together to permit simultaneous synchronized adjustment thereof.

10. The apparatus according to claim 1 wherein said first and second housings have substantially identical bottom walls and substantially identical side walls and wherein said securing means includes means for securing said bottom walls together in spaced parallel relation.

11. The apparatus according to claim 1 wherein said parallax correcting means comprises prism means and bracket means, said bracket means including means for securing said prism means in front of said second opening along said second optical sxis.

12. The apparatus according to claim 11 wherein said second image recording means is a camera having a lens disposed concentrically about said second optical axis in front of said second opening, and wherein said first prism means comprises an optical prism having a first surface disposed normal to said second optical axis and relatively proximate said second opening, and a second surface which is oblique to said second optical axis, said second surface tapering toward said first surface in a direction away from said first optical axis.

13. The apparatus according to claim 12 wherein only said first image recording means has a view finder, said view finder being arranged to permit observation of said field of view along said first optical axis.

14. Photographic apparatus for providing first and second contemporaneous individual records of a common image, said apparatus comprising:
first and second cameras, each having its own separate housing, shutter, focusing lens and optical axis extending through its focusing lens;
mounting means securing said first and second cameras together with their optical axes extending substantially parallel to one another and in the same direction;
film pack means, secured to and comprising part of the housing of said second camera, for automatically developing prints of photographs taken by said second camera inside the housing of said second camera;
actuable actuator means for simultaneously actuating the shutters of said first and second cameras;
a view finder for said first camera arranged to permit observation along the optical axis of said first camera; and
parallax correction means for re-directing the optical axis of said second camera independently of the optical axis of said first camera to adjust the field of view of said second camera to correspond to the observed field of view of said view finder.

15. The apparatus according to claim 14 further comprising common focus control means for simultaneously adjusting said focusing lenses in synchronism.

16. The apparatus according to claim 14 wherein said housings have side and bottom walls, and wherein said mounting means comprises:
first mounting plate secured to the bottom wall of said first camera housing;
a second mounting plate secured to the bottom wall of said second camera housing; and
means securing said mounting plates together.

17. The apparatus according to claim 14 further comprising identification means for printing like identification numbers on photographs taken simultaneously by said first and second cameras.

18. Photographic apparatus for providing first and second contemporaneous individual records of a common image, said apparatus comprising:
first and second cameras, each having its own separate housing, shutter, focusing lens and optical axis extending through its focusing lens;
mounting means securing said first and second cameras together with their optical axes extending parallel to one another and in the same direction;
film pack means, secured to and comprising part of the housing of said second camera, for automatically developing prints of photographs taken by said second camera inside the housing of said second camera;
actuable actuator means for simultaneously actuating the shutters of said first and second cameras;
a view finder for said first camera arranged to permit observation along the optical axis of said first camera; and
identification means for printing like identification numbers on photographs taken simultaneously by said first and second cameras;
wherein said identification means comprises:
an electronic counter responsive to each shutter actuation for automatically incrementing the count in said counter;
a first light-emitting diode array disposed in the housing of a said first camera;
a second light-emitting diode array disposed in the housing of said second camera; and
means responsive to said actuable actuator means for actuating said light-emitting diode arrays for providing illuminated digits corresponding to the existing count in said counter, said illuminated digits being oriented so as to be recorded on said individual records in said first and second cameras.

19. Apparatus for securing first and second cameras to one another in an assembly for use in providing simultaneous exposures with said cameras, said apparatus comprising:
a first plate adapted to be secured to one surface of said first camera;
a second plate adapted to be secured to a surface of said second camera; and
means for securing said first and second plates to one another;
wherein each of said plates is provided with through holes which are adapted to be aligned with appropriate threaded bores in said cameras; and parallax correction means adapted to be removably secured to said second camera to change the field of view of said second camera so as to correspond to the field of view of said first camera.

20. Photographic apparatus for providing first and second contemporaneous individual records of a common image, said apparatus comprising:
first and second cameras, each having its own separate housing, shutter, focusing lens and optical axis extending through its focusing lens;

mounting means securing said first and second cameras together with their optical axes extending parallel to one another and in the same direction;

film pack means, secured to and comprising part of the housing of said second camera, for automatically developing prints of photographs taken by said second camera inside the housing of said second camera;

actuable actuator means for simultaneously actuating the shutters of said first and second cameras;

a view finder for said first camera arranged to permit observation along the optical axis of said first camera;

first image identification means for automatically recording symbols on photographs taken by said first camera, said symbols uniquely identifying the photograph on which they are recorded;

second image identification means for automatically recording further symbols on photographs taken by said second camera, said further symbols uniquely identifying the photograph on which they are recorded and relating each photograph taken by said second camera to a respective photograph taken simultaneously by said first camera.

21. Photographic apparatus for providing first and second contemporaneous individual records of a common image, said apparatus comprising:

first and second cameras, each having its own separate housing, shutter, focusing lens and optical axis extending through its focusing lens;

mounting means securing said first and second cameras together with their optical axes extending parallel to one another and in the same direction;

film pack means, secured to and comprising part of the housing of said second camera, for automatically developing prints of photographs taken by said second camera inside the housing of said second camera;

actuable actuator means for simultaneously actuating the shutters of said first and second cameras; and a view finder for said first camera arranged to permit observation along the optical axis of said first camera;

wherein said housings have side and bottom walls, and wherein said mounting means comprises:

a first mounting plate having a camera mounting surface and an opposite support surface, said camera mounting surface being secured to the bottom wall of said first camera housing;

a second mounting plate having a support surface and an opposite camera mounting surface secured to the bottom wall of said second camera housing; and means securing the support surfaces of said mounting plates together in abutting relation.

22. Photographic apparatus for providing first and second contemporaneous, individual records of a common image, said apparatus comprising:

first selectively actuable visual image recording means for recording a first visual image of objects within a field of view, said first visual image recording means including a first housing having a first opening defined therein and a first optical axis extending through said first opening and into said field of view;

second selectively actuable visual image recording means for recording a second visual image of objects within said field of view, said second visual image recording means including a second housing having a second opening defined therein, a second optical axis extending through said second opening and into said field of view, and positive image film pack means disposed along said second optical axis to receive and automatically form a photographic print of the recorded visual image in the field of view of said second recording means;

mounting means for securing said first and second housings together such that said first and second optical axes extend in generally parallel spaced relation in the same direction;

actuator synchronization means for synchronizing said first and second image recording means for simultaneous actuation; and means for selectively moving only one of said optical axes to effect parallax correction.

23. Apparatus for providing first and second contemporaneous individual photographs of a common image, said apparatus comprising:

first and second cameras, each having its own optical axis;

means securing said first and second cameras together with said optical axes extending generally parallel to one another; and parallax correction means for re-directing the optical axis of one of said cameras independently of the optical axis of the other of said cameras to adjust the field of view of said one camera to the field of view of the other camera.

* * * * *